(12) United States Patent
Guerret et al.

(10) Patent No.: US 8,841,374 B2
(45) Date of Patent: Sep. 23, 2014

(54) METHOD FOR GRINDING CALCIUM CARBONATE IN WATER IN THE PRESENCE OF A SOLUTION OF ACRYLIC POLYMER AND AN ALKALI CARBONATE SALT MANUFACTURED IN PLACE IN THE SAID SOLUTION

(75) Inventors: Olivier Guerret, Pern (FR); Christian Jacquemet, Lyons (FR)

(73) Assignee: Coatex, Genay (FR)

( * ) Notice: Subject to any disclaimer, the term of this patent is extended or adjusted under 35 U.S.C. 154(b) by 186 days.

(21) Appl. No.: 13/411,788

(22) Filed: Mar. 5, 2012

(65) Prior Publication Data

US 2012/0238684 A1    Sep. 20, 2012

Related U.S. Application Data

(60) Provisional application No. 61/468,330, filed on Mar. 28, 2011.

(30) Foreign Application Priority Data

Mar. 18, 2011 (FR) ...................................... 11 52228

(51) Int. Cl.
*C09C 1/02* (2006.01)
*B02C 23/06* (2006.01)
*C01F 11/18* (2006.01)

(52) U.S. Cl.
CPC ............... *C09C 1/021* (2013.01); *C01F 11/183* (2013.01); *B02C 23/06* (2013.01)
USPC ............... 524/425; 423/430; 241/16; 241/18; 241/21

(58) Field of Classification Search
None
See application file for complete search history.

(56) References Cited

U.S. PATENT DOCUMENTS

| 4,503,172 | A | | 3/1985 | Farrar et al. |
| 4,507,422 | A | | 3/1985 | Farrar et al. |
| 4,554,298 | A | | 11/1985 | Farrar et al. |
| 4,554,307 | A | | 11/1985 | Farrar et al. |
| 4,629,130 | A | * | 12/1986 | Veltman .......................... 241/16 |
| 5,647,902 | A | | 7/1997 | Wu |
| 2009/0298988 | A1 | | 12/2009 | Jacquemet et al. |

FOREIGN PATENT DOCUMENTS

| CN | 101326123 A | * | 12/2008 |
| EP | 0 129 329 A2 | | 12/1984 |
| FR | 2 895 686 | | 7/2007 |
| JP | 2000239017 A | * | 9/2000 |
| WO | WO 97/14651 A1 | | 4/1997 |
| WO | WO 2007/068593 | | 6/2007 |

OTHER PUBLICATIONS

Machine Translation of JP 2000-239017A. Sep. 5, 2000.*
International Search Report issued Apr. 2, 2012 in PCT/IB2011/003130 (with English translation of Category of Cited Documents).
Office Action issued Jun. 5, 2014, in corresponding Chinese Patent Application No. 201180069015.8.

* cited by examiner

*Primary Examiner* — Robert C Boyle
*Assistant Examiner* — Stephen Rieth
(74) *Attorney, Agent, or Firm* — Oblon, Spivak, McClelland, Maier & Neustadt, L.L.P.

(57) ABSTRACT

A method for manufacturing an aqueous suspension of calcium carbonate by grinding in an aqueous medium in the presence of an acrylic grinding aid agent and of an alkali carbonate salt. These salts enable the quantity of grinding aid agent used to be reduced, for an equivalent level of performance in terms of rheology and granulometry of the suspensions. The method includes a first step of manufacture of the alkali carbonate salt within the aqueous solution of acrylic polymer itself, through the addition of alkali hydroxide and bubbling of carbon dioxide.

13 Claims, 1 Drawing Sheet

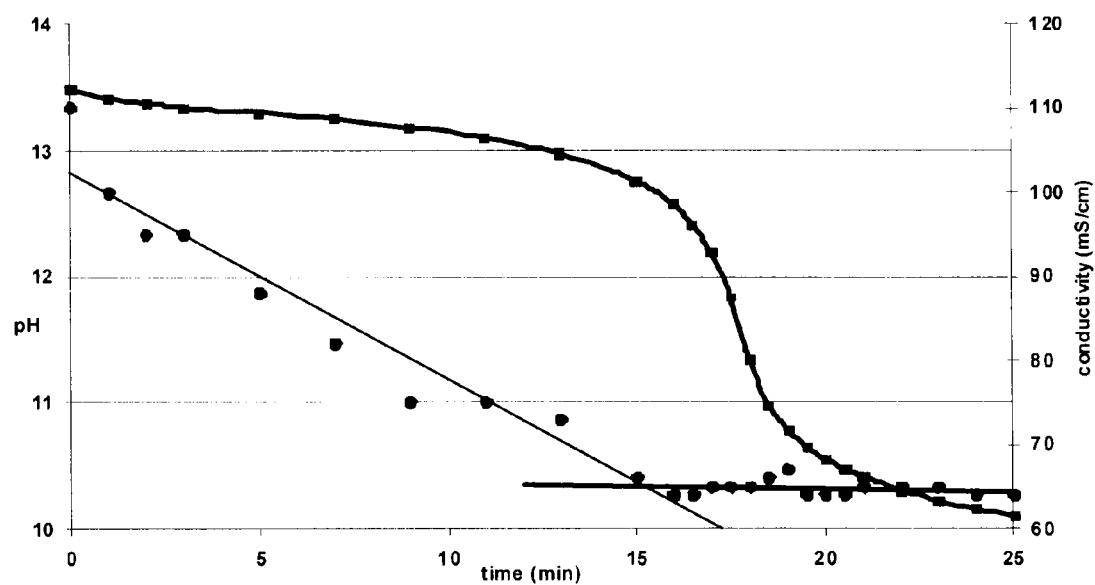

METHOD FOR GRINDING CALCIUM CARBONATE IN WATER IN THE PRESENCE OF A SOLUTION OF ACRYLIC POLYMER AND AN ALKALI CARBONATE SALT MANUFACTURED IN PLACE IN THE SAID SOLUTION

REFERENCE TO PRIOR APPLICATIONS

This application claims priority to U.S. provisional application Ser. No. 61/468,330, filed Mar. 28, 2011; and to French patent application 11 52228, filed Mar. 18, 2011, both incorporated herein by reference.

FIELD OF THE INVENTION

The present invention concerns a method for manufacturing an aqueous suspension of calcium carbonate by grinding in an aqueous medium, in the presence of an acrylic grinding aid agent and of one or more alkali carbonate salts. These salts enable the quantity of grinding aid agent used to be reduced, for an equivalent level of performance in terms of rheology and granulometry of the suspensions. By limiting the quantity of acrylic polymer, a material derived from a non-renewable fossil energy source, our natural resources are protected. Aqueous suspensions of calcium carbonate produced with the invention method also make up a part of the invention.

One of the interesting features of this method lies in a first step of manufacture of the alkali carbonate salt within the aqueous solution of acrylic polymer itself, through the addition of a surplus of alkali hydroxide and bubbling of carbon dioxide. By so doing, rather than directly using an alkaline carbonate salt in powder form, with the disadvantages relating to the handling of a powdery and irritant product, a gas ($CO_2$) and a liquid (an alkali hydroxide) are used. In addition, by consuming carbon dioxide, a contribution is made to reducing the rate of $CO_2$ in the atmosphere, as recommended by the Kyoto protocol.

Additional advantages and other features of the present invention will be set forth in part in the description that follows and in part will become apparent to those having ordinary skill in the art upon examination of the following or may be learned from the practice of the present invention. The advantages of the present invention may be realized and obtained as particularly pointed out in the appended claims. As will be realized, the present invention is capable of other and different embodiments, and its several details are capable of modifications in various obvious respects, all without departing from the present invention. In this regard, the description herein is to be understood as illustrative in nature, and not as restrictive.

BRIEF DESCRIPTION OF THE FIGURE

FIG. 1 shows the changes of pH and of conductivity over time for Example 1 where circles represent conductivity and the squares pH.

BACKGROUND OF THE INVENTION

The mineral industry is a large consumer of chemicals. These chemicals are used in the various steps of transformation/modification/processing to which the mineral matter is subject. Thus, in the case of calcium carbonate of natural or synthetic origin, many operations known as "grinding" operations (reduction of the granulometric size of the particles) when dry or in a wet medium, or "dispersion" operations (suspension of the particles in a liquid), are undertaken.

Both these operations are made more easy through the use, respectively, of grinding aid agents, the role of which is to facilitate the mechanical action of attrition and fragmentation of the particles, and of dispersing agents, the function of which consists in maintaining the viscosity of the suspension within acceptable ranges as the mineral matter is introduced into it. The present invention relates to the methods of grinding which use grinding aid agents.

The prior art is particularly rich on the subject of such additives. For many years, it has been known that water-soluble homopolymers of acrylic acid constitute efficient agents to aid dispersion or grinding in an aqueous medium of calcium carbonate. Reference may usefully be made to the documents FR 2 539 137, FR 2 683 536, FR 2 683 537, FR 2 683 538, FR 2 683 539 and FR 2 802 830.

For the same type of application, it is also advantageous to copolymerise acrylic acid with another carboxylic monomer such as, itaconic acid, methacrylic acid or sulfonic acid, such as acrylamido-2-methyl-2-propane sulfonic acid or maleic anhydride, and/or with another monomer with ethylenic unsaturation, but without a carboxylic group, such as an acrylic ester: these variants are also described in the previous documents.

It is also known that regulating the polymolecularity index of the abovementioned polymers enables some of their performance characteristics to be optimised. This is described in the documents "Synthesis and Characterization of Poly (acrylic acid) Produced by RAFT Polymerization. Application as a Very Efficient Dispersant of $CaCO_3$, Kaolin, and TiO2" (Macromolecules, 36(9), 3066-3077, 2003) and "Dispersion of calcite by poly(sodium acrylate) prepared by Reversible Addition-Fragmentation chain Transfer (RAFT) polymerization" (Polymer (2005), 46(19), 8565-8572). This polymolecularity index can notably be ascertained using polymerisation techniques known as "live" techniques, as illustrated in documents WO 02/070571 and WO 2005/095466. Patent FR 2 514 746, for its part, describes a method called "fractionation" which enables the polymolecularity index to be regulated by selecting polymeric chains which are longer than a given length.

It is also known that the choice of the molecular weight of these polymers may, in the case of particular methods of manufacture of calcium carbonate, improve the efficiency of the said method: patent EP 1 248 821, for example, emphasises carboxylic polymers of high molecular weight, to disperse in water a substantial quantity of a calcium carbonate derived from a step of low-concentration grinding with no polymer present.

Independently of these various strategies for improvement of the application properties of a dispersing or grinding agent with an acrylic acid base (choice of a comonomer, of a polymerisation technique, regulation of molecular weight), it is known that the particular choice of these neutralisation agents leads to appreciably improved application properties.

Thus, document EP 0 100 948 demonstrates the advantage of neutralisation using sodium and calcium ions. A generation of subsequent patents (FR 2 683 538 and FR 2 683 539), for its part, favours the magnesium/sodium ion pair. Finally, a latest generation of patents is known (EP 1 347 834 and EP 1 347 835), which is based on a partial neutralisation (not all the carboxylic sites are neutralised) using the joint action of a monovalent agent (preferentially sodium), and at least one divalent agent (preferentially calcium or magnesium).

SUMMARY OF THE INVENTION

However, all the solutions described above are based on the use of homopolymers and copolymers of acrylic acid, concerning which it is known that they generate carbon dioxide, and that they are derived from a raw material, propylene, which is itself derived from petroleum, i.e. a fossil energy source. Minimizing the quantity of them in industrial methods such as that of grinding calcium carbonate in aqueous media is now a major challenge for the chemical industry. This strategy can contribute to reducing the rate of $CO_2$ as defined by the Kyoto protocol, and to limiting the dependency of our methods which use fossil energy sources: more generally, it is in line with the concepts of "green chemistry" and "sustainable development".

A patent application has been filed as number FR 10 60012, which was published as FR 2 968 219 A1, and which is based on a method of manufacture of an aqueous suspension of calcium carbonate by grinding in water in the presence of an acrylic polymer and an alkali carbonate salt. In a completely advantageous manner, it has been demonstrated that it was then possible to reduce the quantity of polyacrylate used, whilst retaining or improving a number of properties relating to the rheology and granulometry of the suspension. In the examples, the alkali carbonate salt was introduced in powder form, during the grinding operation and/or into the acrylic polymer solution.

The present application describes of an advantageous variant of this method. It involves prior manufacturing of the alkali carbonate salt within the aqueous solution of acrylic polymer which will be used as a grinding aid agent. This manufacture may be undertaken very simply, through the addition into the solution of alkali hydroxide in liquid form, and the introduction of gaseous $CO_2$. The reaction is continued between these two compounds, advantageously, until complete consumption of the alkali hydroxide.

A first benefit of this method lies in the use of a liquid (alkali hydroxide) and a gas ($CO_2$), rather than of a powder (alkali salt), which is a product which is always difficult to handle due to its powdery and irritant character. A second benefit lies in the carbon dioxide consumption: by this means the "$CO_2$ footprint" of the overall method is made smaller, thus reducing the quantity of this product in our atmosphere.

In respect of the performance characteristics obtained with the grinding aid agents in the presence of the alkali carbonate salts according to the present invention, the inventors refer to the possible mechanisms evoked in the abovementioned Application (FR 10 60012), incorporated herein by reference. During the grinding operation the calcium ion concentration increases in the aqueous phase, through the fragmentation of the individual particles of calcium carbonate, and these calcium ions constitute with the polyacrylates complex ion-polymer species, which are more or less insoluble in the aqueous phase.

Without wishing to be bound to any particular theory, the inventors believe that the addition of the alkali carbonate salt to the water modifies at once the solubility of the polyacrylates in the aqueous phase, and also the surface properties of the calcium carbonate particles: this favors the adsorption of the acrylic polymers at the surface of the mineral particles. Since the grinding mechanisms are favored by a satisfactory adsorption of the polyacrylates at the surface of the mineral particles, the efficiency of the grinding method is improved.

In addition, the inventors wish to emphasize that the alkali carbonate salt(s) used according to the invention have no direct action on the grinding of the calcium carbonate: they are not grinding aid agents in the sense of the definition given at the start of this application. In addition, as far as the inventor's current state of knowledge can ascertain, these salts in no way modify the characteristics of the carbonate obtained after grinding compared to a carbonate ground with the same grinding aid agent, but without the salt (however, the grinding agent dose must be increased to obtain the same granulometric and rheological characteristics for the final suspension). These characteristics essentially reflect the customary optical properties of a calcium carbonate, such as its whiteness and its opacity.

DETAILED DESCRIPTION OF THE PREFERRED EMBODIMENTS

A first object of the invention is a method to manufacture an aqueous suspension of calcium carbonate by grinding in water with at least one water-soluble polymer of acrylic acid, with the introduction of at least one alkali carbonate salt into the suspension, including the following steps:

a) introducing into an aqueous solution at least one water-soluble polymer of acrylic acid, whether acidic or partially or totally neutralised, and an alkaline alkali hydroxide in liquid form, where the quantity of hydroxide used is greater than that required for total neutralisation of the said polymer, b) introducing into the solution, before and/or during and/or after, and preferentially after step a), gaseous carbon dioxide, c) introducing the solution obtained after step b) into an aqueous suspension containing calcium carbonate d) grinding the suspension.

When it is stated that the quantity of hydroxide used is greater than that required for total neutralisation of the acrylic polymer, it is meant that this quantity is greater than that required to neutralise the polymer. For example, if the polymer is initially totally neutralised, the introduced alkali hydroxide will be used exclusively to produce the alkali salt by reaction with the carbon dioxide. If the polymer is initially partly neutralised or acidic, the alkali hydroxide will be introduced in a quantity greater than that strictly required to neutralise the polymer.

The grinding can be accomplished using any method, including those currently well known to the skilled man in the art. The skilled man in the art will know how to modify the rate of flow of carbon dioxide, notably taking into account the size and geometry of the reactor.

This method is preferably characterized in that the carbon dioxide is introduced in a gaseous blend in combination with a gas or a blend of gases, preferentially chosen from among nitrogen and air.

This method is preferably characterized in that the volume concentration of carbon dioxide is between 10% and 100% of the gaseous blend, including 20, 30, 40, 50, 60, 70, 80 and 90%.

This method is preferably characterized in that the temperature of the aqueous solution, in the course of steps a) and b), is between 10° C. and 90° C., and more preferentially between 15° C. and 50° C.

This method is preferably characterized in that steps a) and b) are accomplished with mechanical stirring of the aqueous solution.

Generally, this method is preferably characterized in that the alkali alkaline hydroxide is chosen from among the hydroxides of sodium, potassium, lithium and their blends, and more preferentially from among the hydroxides of sodium, potassium and their blends, and very preferentially is potassium hydroxide.

This method is preferably characterized in that the water-soluble polymer of acrylic acid has a molecular weight of between 3,000 g/mole and 15,000 g/mole, and more preferentially between 4,000 g/mole and 10,000 g/mole. This molecular weight is determined, throughout the present application, by the method described in the part containing the examples.

This method is preferably characterized in that the water-soluble polymer of acrylic acid, when it is present in the aqueous solution before the alkali hydroxide is introduced, and when it is totally or partially neutralised, is so neutralised by a neutralisation agent chosen from among the hydroxides of sodium, potassium or lithium, and preferentially from among the hydroxides of sodium and potassium.

This method is preferably characterized in that the water-soluble polymer of acrylic acid, when it is a copolymer, is a copolymer of acrylic acid with another monomer chosen from among the methacrylic, crotonic, isocrotonic, cinnamic, maleic, itaconic and acrylamido-2-methyl-2-propane sulfonic acids, and their blends.

This method is preferably characterized in that water-soluble polymer of acrylic acid is obtained by methods of radical polymerisation in solution, in a direct or reverse emulsion, in suspension or precipitation in appropriate solvents, in the presence of catalytic systems and transfer agents, or again by methods of controlled radical polymerisation, and preferentially by nitroxide mediated polymerisation (NMP) or by cobaloximes, atom transfer radical polymerisation (ATRP) or controlled radical polymerisation, controlled by sulphurated derivatives, chosen from among carbamates, dithioesters or trithiocarbonates (RAFT) or xanthates.

This method is preferably characterized in that the water-soluble polymer of acrylic acid is, before or after being neutralised, treated and separated into several phases, using static or dynamic methods, by one or more polar solvents preferentially belonging to the group constituted by methanol, ethanol, propanol, isopropanol, the butanols, acetone and tetrahydrofuran, and their blends.

The following examples allow the invention to be better apprehended, without however limiting its scope.

EXAMPLES

Throughout the present application, the granulometric characteristics relative to the calcium carbonate are determined using a Sedigraph™ 5100 device, sold by the company MICROMERITICS™.

The molecular weights are determined by Steric Exclusion Chromatography (hereinafter CES), using the following method.

A test portion of the polymer solution corresponding to 90 mg of dry matter is introduced into a 10 mL flask. Mobile phase is added, with a 0.04% addition of DMF, until a total mass of 10 g is obtained. The composition of this mobile phase is as follows: $NaHCO_3$: 0.05 mole/L, $NaNO_3$: 0.1 mole/1, triethanolamine: 0.02 mole/L, $NaN_3$ 0.03% by mass. The CES chain consists of an isocratic pump of the Waters™ 510 type, the flow rate of which is set at 0.8 mL/min., a Waters 717+ sample changer, a kiln containing a precolumn of the "Guard Column Ultrahydrogel Waters™" type, followed by a linear column of the "Ultrahydrogel Waters™" type, which is 30 cm in length and has an internal diameter of 7.8 mm. Detection is accomplished by a differential refractometer of the Waters™ 410 type. The kiln is heated to a temperature of 60° C. and the refractometer heated to a temperature of 45° C.

The CES is calibrated with a series of sodium polyacrylate standards supplied by Polymer Standard Service having maximum molecular weight of between 2,000 and $1.10^6$ g/mole and of polymolecularity index of between 1.4 and 1.7, and also with a sodium polyacrylate of molecular weight equal to 5,600 g/mole and polymolecularity index equal to 2.4. The calibration graph is of the linear type and takes account of the correction obtained using the flow rate marker (DMF). Acquisition and processing of the chromatogram are accomplished through use of the PSS WinGPC Scientific v 4.02 application. The chromatogram obtained is incorporated in the area corresponding to molecular weights higher than 65 g/mole.

Example 1

In a 10-liter reactor, fitted with an agitator mixer and a temperature regulation system, and also with a device for monitoring conductivity and pH, the first step consists of introducing 5,464 grams of an aqueous solution, containing 41% by dry weight of a water-soluble homopolymer of acrylic acid, which is totally neutralised by sodium hydroxide, of molecular weight equal to 5,500 g/mole. 910 grams of potassium hydroxide and 144 grams of water are then introduced. These quantities are regulated so as to obtain, ultimately, an aqueous solution containing 2,000 ppm by dry weight of acrylic polymer and 500 ppm by dry weight of potassium carbonate. The agitator mixer is set at 750 revolutions per minute, and the temperature at 70° C. When the solution has been raised to the temperature level, an equivolumic blend of carbon dioxide and air is introduced, at a flow rate of 10 liters per minute, through the base of the reactor.

The changes of pH and of conductivity over time are then monitored (see FIG. 1, in which the circles represent conductivity and the squares pH). The inflow of the gas is discontinued when the conductivity stabilises, and well after the point of inflection observed for the pH: i.e. well after the total neutralisation of the polymer and after complete consumption of the potassium hydroxide. An aqueous solution is then obtained, the pH of which is approximately equal to 10.1.

Example 2

This example illustrates the use of the previously manufactured aqueous solution, in a method for grinding in an aqueous medium of calcium carbonate.

In practice, the operation to grind the mineral substance to be refined consists in grinding the mineral substance with a grinding body into very fine particles in an aqueous medium containing the grinding aid agent.

The grinding operation proper is undertaken using a DYNO®-MILL type KDL-Pilot A device containing the grinding body, which advantageously has a granulometry of between 0.20 and 4 millimeters. The grinding body generally has the form of particles of materials as diverse as silicon dioxide, aluminium 25 oxide, zirconium oxide or blends thereof, together with synthetic resins of great hardness, steels or other. An example of the composition of such grinding bodies is given by patent FR 2 303 681 which describes grinding elements formed 30% to 70% by weight of zirconium oxide, 0.1% to 5% of aluminium oxide, and 5 to 20% of silicon dioxide. The grinding body is preferably used in a quantity such that the ratio by weight between this grinding material and the mineral substance for grinding is at least 2/1, where this ratio is preferably between the limits 3/1 and 5/1.

The first step is prepare an aqueous suspension of calcium carbonate to be ground, by introducing, whilst stirring the water, the blend containing the dispersant and an additive, followed by the calcium carbonate. After 20 minutes' stirring this suspension is introduced into the grinding chamber containing the grinding body. Movement is imparted to the latter by means of rotating blades. The mineral suspension is then subjected to the mechanical action of crushing and attrition in successive passes. The grinding chamber is fitted with a twin cooling enclosure in order to maintain the grinding temperature within a temperature range of between 60 and 80° C., and it is also fitted with a pressure indicator.

The continuous grinding operation is maintained until a rise in pressure is observed in the grinder of 0.5 bar. The ground suspension is then sampled and characterised.

For each of the tests undertaken the Brookfield™ viscosity is determined at 100 revolutions per minute and at 25° C., at the output of the grinder (μ100 in mPa·s): this datum enables the fluidity of the obtained suspension to be quantified.

The proportion by weight of particles the diameter of which is less than 2 μm (%<2 in %) is then also determined with a Sedigraph™ 5100 of the company Micromeritics™: by this means the fineness of the carbonate grains obtained after grinding is evaluated.

The corresponding results are shown in table 1.

In all the tests, the ppm values designate mgs of dry additive relative to the dry weight of calcium carbonate expressed in kg.

Test No 1:

This test illustrates the prior art and uses 2,250 ppm of a water-soluble homopolymer of acrylic acid which is totally neutralised by sodium hydroxide and of molecular weight equal to 5,500 g/mole.

Test No 2:

This test illustrates the invention and uses 2,500 ppm of the blend manufactured according to the test of example 1. In this case, 2,000 ppm of a water-soluble homopolymer of acrylic acid is therefore used, which is totally neutralised by the sodium hydroxide, of molecular weight equal to 5,500 g/mole, and 500 ppm of potassium carbonate.

TABLE 1

| Test n° | 1 | 2 |
|---|---|---|
| PA/IN/HI | PA | IN |
| ABr (ppm) | 2,000 | 2,250 |
| Add (ppm) | 500 | 0 |
| μ100 (mPa · s) | 165 | 160 |
| % <2 (%) | 52 | 55 |

PA/IN: prior art/invention
ABr (ppm): acrylic grinding aid agent (quantity in ppm)
Add (ppm): if applicable, an alkaline carbonate salt used with the grinding aid agent (quantity in ppm)

By comparing test no 1 according to the prior art with test no 2 according to the invention, it is observed that almost-identical characteristics are obtained in terms of rheology and granulometry. Conversely, use of the aqueous solution according to test no 2 enables the $CO_2$ footprint of the overall method to be made smaller advantageously, notably through the consumption of the $CO_2$ during the step of manufacture of the said aqueous solution. In addition, since the quantity of polymer used is smaller in test no 2, a contribution is made to preserving the fossil energy sources from which is derived the acrylic acid which constitutes the raw material of this polymer.

Example 3

This example illustrates the use of the suspensions obtained above, with a view to obtaining a calcium carbonate with increased fineness by means of a subsequent grinding step.

In this example, the initial material used is the aqueous suspensions obtained in the course of example 2, the fineness of which it is sought to improve by continuing the grinding in the presence of a homopolymer of acrylic acid, half the carboxylic sites of which are neutralised by sodium hydroxide, and the other half of which are neutralised by magnesium hydroxide, of molecular weight equal to 5,500 g/mole. The corresponding tests are referenced 1 b and 2 b.

The grinding is continued until a calcium carbonate suspension is obtained, 80% by weight of the particles of which have a diameter of less than 1 μm.

The Brookfield™ viscosity is then measured, at 100 revolutions per minute, and at 25° C., at the output of the grinder (μ100 in mPa·s), as is the demand for acrylic grinding aid agent used in the course of this second grinding step (ABr in ppm).

The corresponding results are shown in table 2.

TABLE 2

| Test n° | 1 b | 2 b |
|---|---|---|
| PA/IN | PA | IN |
| ABr (ppm) | 8,500 | 8,500 |
| μ100 (mPa · s) | 280 | 285 |

It is observed that, with the invention, a calcium carbonate is manufactured having the same granulometric characteristics as those obtained according to the prior art. The method according to the invention therefore also enables calcium carbonates to be obtained having a greater fineness, but with a smaller $CO_2$ footprint of the overall method, and in which less (overall) acrylic polymer is consumed than with the prior art.

In view of the above, it is clear that a preferred embodiment herein is a method of manufacturing an aqueous suspension of calcium carbonate, comprising:

a) preparing an aqueous solution comprising water, at least one water-soluble polymer of acrylic acid and an alkali hydroxide in liquid form, where the quantity of hydroxide present is greater than that required for total neutralisation of the polymer, b) introducing into the aqueous solution, during and/or after its preparation in a), gaseous carbon dioxide to provide a grinding aid solution, c) introducing the grinding aid solution into an aqueous suspension comprising water and calcium carbonate to produce a grinding suspension, and d) grinding the grinding suspension.

The above written description of the invention provides a manner and process of making and using it such that any person skilled in this art is enabled to make and use the same, this enablement being provided in particular for the subject matter of the appended claims, which make up a part of the original description.

As used herein, the words "a" and "an" and the like carry the meaning of "one or more."

The phrases "selected from the group consisting of," "chosen from," and the like include mixtures of the specified materials. Terms such as "contain(s)" and the like are open terms meaning 'including at least' unless otherwise specifically noted.

All references, patents, applications, tests, standards, documents, publications, brochures, texts, articles, etc. mentioned herein are incorporated herein by reference. Where a numerical limit or range is stated, the endpoints are included. Also, all values and subranges within a numerical limit or range are specifically included as if explicitly written out.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. A method of manufacturing an aqueous suspension of calcium carbonate, comprising:
   a) preparing an aqueous solution comprising water, at least one water-soluble polymer of acrylic acid, and an alkali hydroxide, where the quantity of hydroxide present is greater than that required for total neutralisation of the polymer,
   b) introducing into the aqueous solution, during and/or after its preparation in a), gaseous carbon dioxide to provide a grinding aid solution,
   c) introducing the grinding aid solution into an aqueous suspension comprising water and calcium carbonate to produce a grinding suspension, and
   d) grinding the grinding suspension,
   wherein an alkali carbonate salt is formed in b).

2. The method according to claim 1, wherein the carbon dioxide is introduced in a gaseous blend in combination with at least one other gas.

3. The method according to claim 2, wherein the volume concentration of carbon dioxide is between 10% and 90% of the gaseous blend.

4. The method according to claim 1, wherein the temperature of the aqueous solution, in a) and b), is 10° C.-90° C.

5. The method according to claim 1, wherein a) and b) are accomplished with mechanical stirring of the aqueous solution.

6. The method according to claim 1, wherein the alkali hydroxide is chosen from sodium hydroxide, potassium hydroxide, lithium hydroxide and mixtures thereof.

7. The method according to claim 1, wherein the water-soluble polymer of acrylic acid has a molecular weight of 3,000 g/mole-15,000 g/mole.

8. The method according to claim 1, wherein the water-soluble polymer of acrylic acid is a water-soluble copolymer of acrylic acid.

9. The method according to claim 8, wherein the water-soluble copolymer of acrylic acid is a copolymer of acrylic acid with a monomer selected from the group consisting of methacrylic acid, crotonic acid, isocrotonic acid, cinnamic acid, maleic acid, itaconic acid, acrylamido-2-methyl-2-propane sulfonic acid, and mixtures thereof.

10. The method according to claim 1, wherein said water-soluble polymer of acrylic acid is, before or after being neutralised, separated into plural phases, using static or dynamic methods, by one or more polar solvents.

11. The method according to claim 10, wherein the one or more polar solvents are selected from the group consisting of methanol, ethanol, propanol, isopropanol, the butanols, acetone, tetrahydrofuran, and mixtures thereof.

12. The method according to claim 1, wherein the alkali hydroxide is potassium hydroxide.

13. The method according to claim 1, wherein the water-soluble polymer of acrylic acid has a molecular weight of from 4,000 g/mole to 10,000 g/mole.

* * * * *